United States Patent
Fujiwara

(10) Patent No.: US 10,477,109 B2
(45) Date of Patent: Nov. 12, 2019

(54) IMAGING APPARATUS AND CONTROL METHOD THEREFOR

(71) Applicant: CANON KABUSHIKI KAISHA, Tokyo (JP)

(72) Inventor: Shogo Fujiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/015,402

(22) Filed: Jun. 22, 2018

(65) Prior Publication Data

US 2018/0376070 A1 Dec. 27, 2018

(30) Foreign Application Priority Data

Jun. 26, 2017 (JP) .................................. 2017-124595

(51) Int. Cl.
H04N 5/232 (2006.01)
H04N 5/225 (2006.01)

(52) U.S. Cl.
CPC ....... *H04N 5/23267* (2013.01); *H04N 5/2254* (2013.01); *H04N 5/23241* (2013.01); *H04N 5/23258* (2013.01)

(58) Field of Classification Search
CPC .... H04N 5/23248; H04N 5/144; H04N 5/145; H04N 5/23251; H04N 1/00885; H04N 5/2254; H04N 5/23241; H04N 5/23258; H04N 5/23267; H04N 5/23287; G02B 27/646; G03B 2205/0007
See application file for complete search history.

(56) References Cited

U.S. PATENT DOCUMENTS

| | | | | |
|---|---|---|---|---|
| 6,229,402 B1* | 5/2001 | Kataoka | ................. | H02N 2/142 310/316.01 |
| 2005/0128341 A1* | 6/2005 | Murakami | ............... | G02B 7/08 348/345 |
| 2007/0242142 A1* | 10/2007 | Okazaki | ................. | G03B 13/18 348/239 |
| 2008/0055421 A1* | 3/2008 | Kimura | ................ | G02B 27/646 348/208.99 |
| 2009/0207493 A1* | 8/2009 | Ohashi | ...................... | B08B 7/02 359/507 |
| 2010/0066885 A1* | 3/2010 | Kawanami | ......... | H04N 5/23241 348/311 |
| 2010/0110203 A1* | 5/2010 | Noguchi | ................ | G03B 17/00 348/208.4 |

(Continued)

FOREIGN PATENT DOCUMENTS

JP 2016-048289 A 4/2016

*Primary Examiner* — Chiawei Chen
(74) *Attorney, Agent, or Firm* — Cowan, Liebowitz & Latman, P.C.

(57) ABSTRACT

An imaging apparatus can mount a lens device, which is an external device, on the main body thereof. The main body includes a shake detection unit that detects a shake amount and a power supply fluctuation detection unit that detects a fluctuation in power supply supplied from a power supply unit to the lens device. A frequency calculation unit calculates a driving frequency of the lens device based on the fluctuation in power supply during lens driving. If the driving frequency of the lens device interferes with the driving frequency of the shake detection unit, the system control unit inhibits or restricts a function using the shake detection unit.

12 Claims, 8 Drawing Sheets

(56) References Cited

U.S. PATENT DOCUMENTS

| | | | | |
|---|---|---|---|---|
| 2010/0208128 A1* | 8/2010 | Yumiki | ................... | G02B 7/36 |
| | | | | 348/360 |
| 2011/0292270 A1* | 12/2011 | Nakamura | ............... | G03B 7/20 |
| | | | | 348/335 |
| 2012/0044369 A1* | 2/2012 | Irisawa | .............. | H04N 5/23248 |
| | | | | 348/208.4 |
| 2012/0243093 A1* | 9/2012 | Tonar | ................. | H01L 41/0973 |
| | | | | 359/507 |
| 2015/0349236 A1* | 12/2015 | Furuta | ................. | B41J 2/14233 |
| | | | | 348/208.11 |
| 2016/0261806 A1* | 9/2016 | Honjo | ................ | H04N 5/23209 |
| 2016/0353028 A1* | 12/2016 | Noto | ................... | H04N 5/23287 |
| 2017/0054387 A1* | 2/2017 | Sumioka | ............... | H02M 7/523 |
| 2017/0115502 A1* | 4/2017 | Tai | ....................... | G02B 27/646 |
| 2017/0214340 A1* | 7/2017 | Atsuta | .................... | H02N 2/103 |
| 2018/0041700 A1* | 2/2018 | Ishmaru | ................ | G01R 13/02 |
| 2018/0143396 A1* | 5/2018 | Watanabe | ............... | G02B 7/08 |
| 2018/0205862 A1* | 7/2018 | Ishikawa | ............... | H02K 33/18 |
| 2018/0267388 A1* | 9/2018 | Karibe | ................... | G03B 9/42 |
| 2018/0299689 A1* | 10/2018 | Takahashi | ............... | G01H 3/04 |
| 2018/0314041 A1* | 11/2018 | Igasaki | ................. | G02B 15/14 |
| 2019/0173987 A1* | 6/2019 | Sung | .................... | G06F 1/1658 |

* cited by examiner

FIG. 5

| Correction direction | Lens not causing interference | | Lens causing interference | |
| --- | --- | --- | --- | --- |
| | Image shake correction compatible lens | Image shake correction incompatible lens | Image shake correction compatible lens | Image shake correction incompatible lens |
| Pitch | Permit (correction at lens side) | Permit (correction in camera) | Permit (correction at lens side) | Inhibition or restriction (correction in camera) |
| Yaw | Permit (correction at lens side) | Permit (correction in camera) | Permit (correction at lens side) | Inhibition or restriction (correction in camera) |
| Roll | Permit (correction in camera) | Permit (correction in camera) | Inhibition or restriction (correction in camera) | Inhibition or restriction (correction in camera) |

FIG. 6

| Set stream degree | Lens not causing interference | Lens causing interference |
| --- | --- | --- |
| High | Compatible | Incompatible |
| Standard: Medium | Compatible | Compatible |
| Low | Compatible | Incompatible |

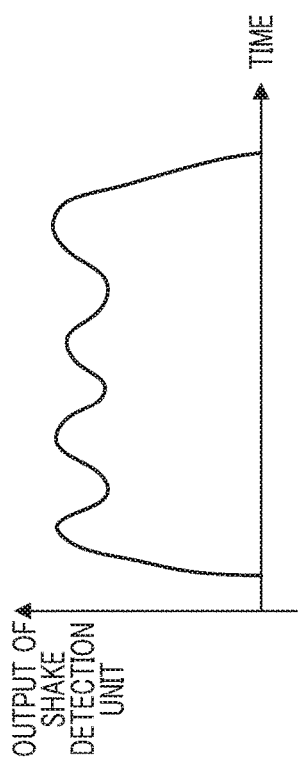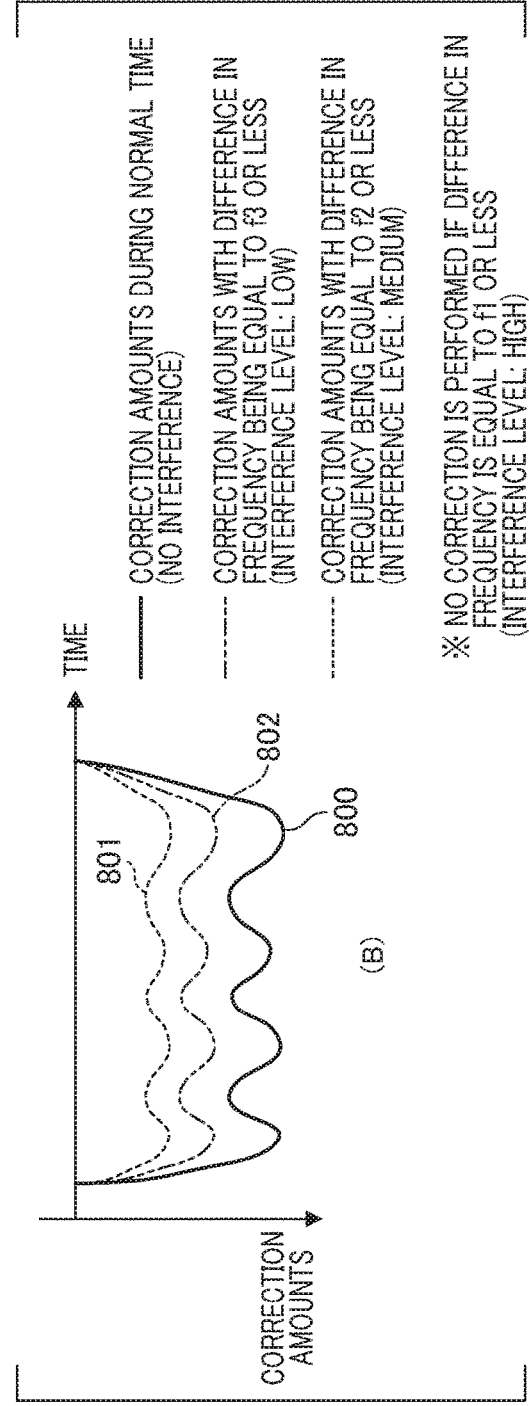

IMAGING APPARATUS AND CONTROL METHOD THEREFOR

BACKGROUND OF THE INVENTION

Field of the Invention

The present invention relates to control that avoids and suppresses an influence of interference caused in a shake detection unit in the main body of an imaging apparatus due to vibrations or noises from an external device mounted on the main body of the imaging apparatus.

Description of the Related Art

In a typical imaging apparatus having an image shake correction function, a shake detection sensor such as an angular velocity sensor is used for detecting amounts of camera shake. Image shake correction on an image forming plane is performed by driving a part or all of an imaging optical system based on information about detected shaking of the imaging apparatus.

In this connection, the imaging apparatus includes various vibration sources such as a mirror, a drive unit of a shutter, an ultrasonic motor that controls focus adjustment, and a stepper motor. The sensitivity of the angular velocity sensor is very high. If vibrations have occurred at a cycle close to a cycle corresponding to a driving frequency of the angular velocity sensor, the angular velocity sensor sometimes subject to interference due to the vibrations. If noise components are superimposed on an output signal of the angular velocity sensor, image shake correction may not be performed properly in some cases.

Japanese Patent Application Laid-Open No. 2016-048289 discloses that an imaging apparatus comprises a unit that avoids causing interference in the shake detection unit due to vibrations or noises generated in the imaging apparatus if a readout frequency of the imaging unit and a driving frequency of the drive unit are changed.

However, in the conventional technique disclosed in the Japanese Patent Application Laid-Open No. 2016-048289, a drive unit of an accessory device such as an interchangeable lens and an external flash, which is mounted on the main body of the imaging apparatus, is driven by an inherent driving frequency that cannot be controlled from the imaging apparatus. Hence, the angular velocity sensor may be subject to interference of vibrations due to the driving of the mounted accessory device.

SUMMARY OF THE INVENTION

The present invention is to avoid or suppress the influence of interference in a main body of an imaging apparatus due to vibrations or noises generated from a drive unit of an external device mounted on the main body of the imaging apparatus so as not to cause difficulties in a function using a shake detection unit.

According to the present invention, an apparatus according to an embodiment of the present invention is an imaging apparatus on which an external device can be mounted on a main body that includes at least one processor and at least one memory functioning as: a first detection unit configured to detect a shake of the main body; a power supply unit configured to supply a power supply from the main body to the external device mounted on the main body; a second detection unit configured to detect a fluctuation in the power supply; a calculation unit configured to calculate a driving frequency of the external device based on the fluctuation in the power supply detected by the second detection unit; and a control unit configured to perform control that avoids or suppresses an influence on a function that has used the first detection unit caused by the driving frequency of the external device, which has been calculated by the calculation unit, interfering with a driving frequency of a detector used for detecting the shake of the main body by the first detection unit.

According to the present invention, it is possible to avoid or suppress the influence of interference on the main body due to vibrations and noises generated from the driving unit of the external device mounted on the main body of the imaging apparatus so as not to cause difficulties in the function using the shake detection unit.

Further features of the present invention will become apparent from the following description of exemplary embodiments (with reference to the attached drawings).

BRIEF DESCRIPTION OF THE DRAWINGS

FIG. 5 is a diagram illustrating a restriction process with respect to the image shake correction function in the first embodiment.

FIG. 6 is a diagram illustrating a restriction process with respect to a panning shot function in the first embodiment.

FIGS. 8A and 8B are diagrams illustrating a relation between amounts of detected vibrations and image shake correction amounts in the second embodiment.

DESCRIPTION OF THE EMBODIMENTS

Hereinafter, preferred embodiments of the present invention will be described in detail with reference to the accompanying drawings. In the following embodiments, although an example of a lens device will be described to serve as an external device that can be mounted on the main body of an imaging apparatus, the present invention is applicable to an imaging apparatus on which various accessory devices are mounted.

Figure 1:
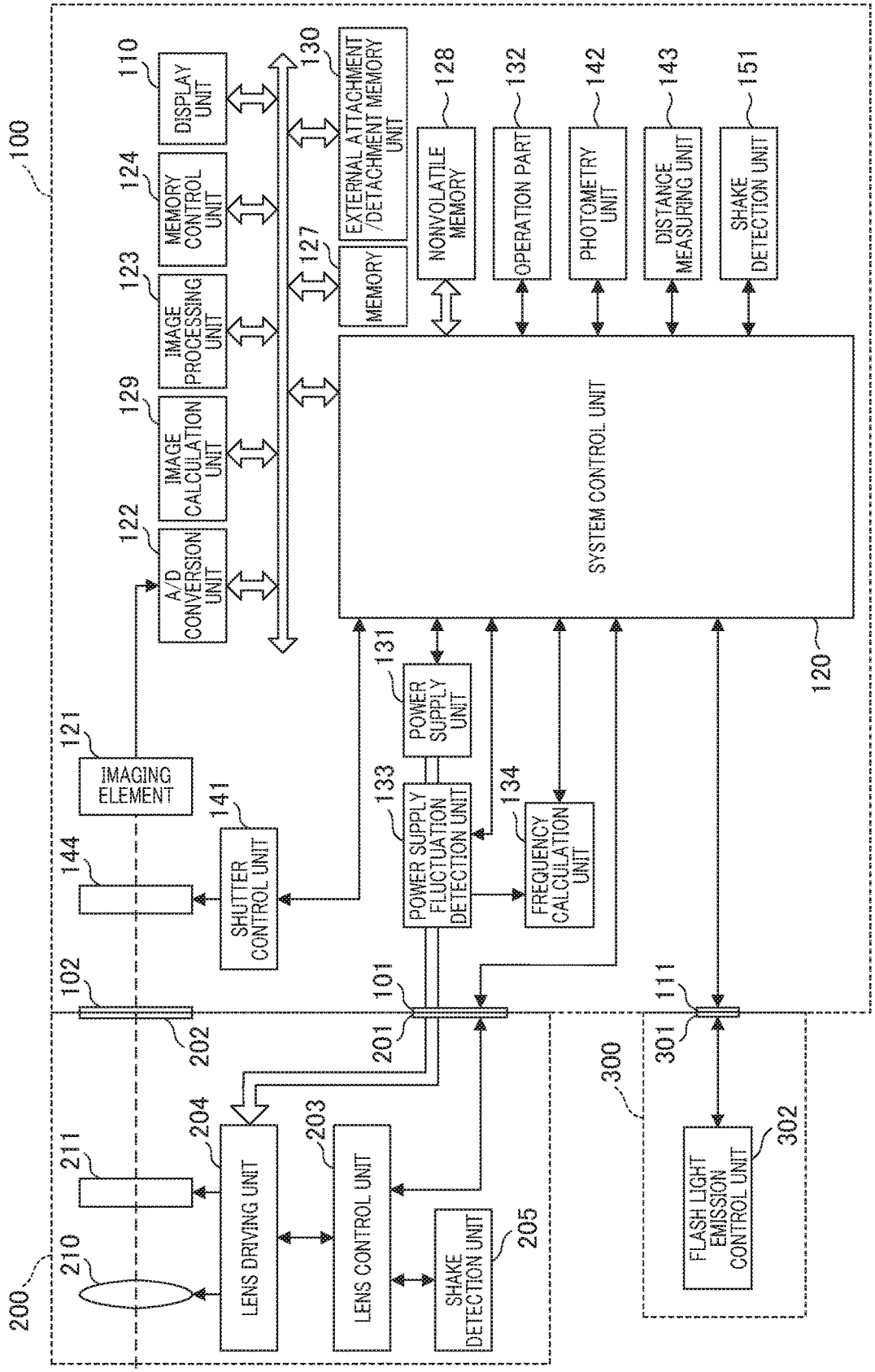
FIG. 1 is a block diagram illustrating a configuration of an imaging apparatus according to an embodiment of the present invention.

FIG. 1 is a block diagram illustrating a configuration example of an imaging apparatus including a shake detection unit according to an embodiment of the present invention. A lens device 200 can be mounted on an imaging apparatus main body 100. A configuration of the imaging apparatus main body (hereinafter, referred to simply as the "main body") 100 will be described.

An imaging element 121 receives light from an object formed through an imaging optical system of the lens device 200 and a shutter 144, and photoelectrically converts an optical image of the object into an electric signal. An A/D conversion unit 122 converts an analog signal output from the imaging element 121 into a digital signal. The A/D converted digital signal is controlled by a memory control unit 124 and a system control unit 120, and stored in a memory 127. The memory 127 stores data such as captured still images and moving images and images for reproduction display. The memory 127 has a storage capacity that is sufficient to store a predetermined number of the still images and the moving images.

An image processing unit 123 performs a pixel interpolation process, a color conversion process, and the like on data of the digital signal that has been A/D-converted by the A/D conversion unit 122 or data from the memory control unit 124. The image processing unit 123 includes a compression/decompression circuit that compresses and decompresses image data by using, for example, adaptive discrete cosine transformation (ADCT). The image processing unit 123 can read the image data stored in the memory 127, perform a compression process or a decompression process, and write the processed data to the memory 127.

The image calculation unit 129 calculates a contrast value of the captured image and performs measurement related to a focus state of the captured image based on the contrast value. A correlation value between the image data stored in the memory 127 and the currently captured image data is calculated, and a process that searches for an image region with the highest correlation is executed. The memory control unit 124 controls transmission and reception of data between the A/D conversion unit 122, the image processing unit 123, a display unit 110, an external attachment/detachment memory unit 130, and the memory 127. Data output from the A/D conversion unit 122 is written to the memory 127 via the image processing unit 123, the memory control unit 124, or directly via the memory control unit 124.

The display unit 110 includes, for example, a liquid crystal panel unit and a backlight illumination unit. The display unit 110 displays a live image in real time, based on the captured image data acquired by the imaging element 121. Accordingly, it is possible to perform what is referred to as "live view shooting". During live view shooting, the display unit 110 displays an AF frame superimposed on the image so that an operator can recognize the position of the object that is an AF (auto focus) target. The AF frame corresponds to a focus detection region for focusing on a desired object. If the display unit 110 has a touch panel, the operator can perform an operation (touch AF) that specifies a desired position of the AF frame on the display screen.

The system control unit 120 is a central unit that controls the entire imaging system and can communicate with a lens control unit 203 in the lens device 200 via connection terminal units 101 and 201. The connection terminal unit 101 is located at the main body 100 side, and the connection terminal unit 201 is located at the lens device 200 side. The system control unit 120 can control the lens device 200 and a flash unit 300. The system control unit 120 includes a CPU (Central Processing Unit) and controls each configuration unit of the imaging system by executing a control program. The system control unit 120 is connected to each configuration unit via a bus. In the memory 127, a program stack region, a status storage region, a calculation region, a work region, and an image data display region of the system control unit 120 are reserved. The CPU performs various calculations by using the calculation region of the memory 127.

A nonvolatile memory 128 is a storage device that enables electrical erasing and recording, for which, for example, a flash memory, an EEPROM (electrically erasable programmable read-only memory), and the like are used. The nonvolatile memory 128 stores data in a shooting state and a program that controls the imaging apparatus.

The external attachment/detachment memory unit 130 is a memory unit that records data of an image file on a recording medium such as Compact Flash (registered trademark) or an SD card and reads out the data. The user can attach and detach the recording medium to and from the main body 100. A power supply unit 131 includes, for example, a battery, a battery detection circuit, a DC-DC converter, a switch circuit that switches a unit to be energized, and detects the presence or absence of the mounting of a battery, the type of the battery, and a remaining battery level. The power supply unit 131 controls the DC-DC converter based on the detected result and an instruction from the system control unit 120, performs a power supply to each block unit of the main body 100, and supplies power to a lens driving unit 204 and the like via the connection terminal units 201 and 101.

In accordance with an instruction from the system control unit 120, a power supply fluctuation detection unit 133 detects fluctuations in power supply supplied to the lens driving unit 204. Fluctuations in power supply are detected as a change in power supply voltage or power supply current. A frequency calculation unit 134 acquires information indicating the fluctuation in the power supply of the lens device 200 from the power supply fluctuation detection unit 133, and calculates a driving frequency of the lens driving unit 204 in accordance with the instruction from the system control unit 120. Additionally, the frequency calculation unit 134 calculates the difference between the driving frequency of the lens driving unit 204 and a driving frequency of a shake detection unit 151.

An operation part 132 includes an operation member for inputting various operation instructions to the system control unit 120. The operation part 132 is configured by one or a combination of a switch, a dial, a pointing device using line-of-sight detection, a voice recognition device, and the like.

A shutter control unit 141 controls the shutter 144 in accordance with the control signal from the system control unit 120 to control an exposure time of the imaging element 121. While the shutter 144 shields the imaging element 121 during non-shooting, the shutter 144 guides light rays to the imaging element 121 during shooting. The shutter control is performed in cooperation with the lens control unit 203 that controls the aperture 211 of the lens device 200 based on the photometric information from a photometry unit 142.

If the light rays enter through the imaging optical system, the photometry unit 142 for performing an AE (automatic exposure) process performs a photometric process with light that has been received via the photometric lens, and outputs the measurement result to the system control unit 120. It is possible to measure an exposure state of the image that has been imaged as an optical image. Additionally, the photometry unit 142 has an EF (flash dimming control) processing function by cooperating with the flash unit 300. The flash unit 300 has a light projecting function of the AF auxiliary light and a flash dimming control function.

A distance measuring unit 143 performs the AF process and outputs the detected result of the focus state to the system control unit 120. If the light rays enter through the imaging optical system, the distance measuring unit 143 receives light via the distance measuring mirror and can measure an in-focus state of the image that has been imaged as an optical image. Note that, during live view shooting, it is also possible to measure the in-focus state of the captured image in accordance with a contrast value calculated based on the image data output from the image calculation unit 129.

Figure 3:
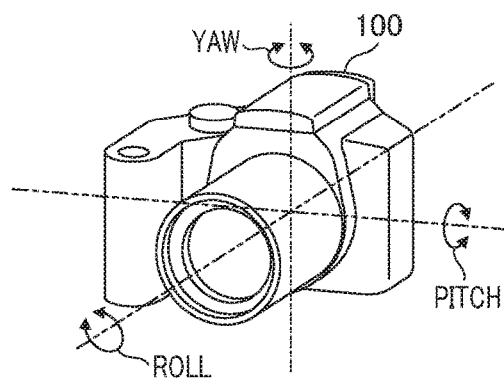
FIG. 3 is a diagram illustrating correction directions related to an image shake correction function according to the first embodiment.

The shake detection unit 151 includes, for example, an angular velocity sensor, and detects amounts of vibrations of the main body unit 100. The angular velocity detection signal is output to the system control unit 120. FIG. 3 is a schematic diagram illustrating vibration directions that can be detected by the shake detection unit 151. The shake detection unit 151 detects vibrations in three axial directions: the pitch direction, yaw direction, and roll direction. The pitch direction is a rotation direction around the first axis out of the two axes orthogonal to the optical axis of the imaging optical system, and the yaw direction is a rotation direction around the second axis. The roll direction is a rotation direction around the optical axis of the imaging optical system. For example, the angular velocity of the panning operation of the imaging apparatus is detected in accordance with the vibrations in each direction.

The main body 100 includes a lens mount 102 that is a holding mechanism unit for connecting with the lens device 200. The lens device 200 can be mounted on the main body 100 by coupling the lens mount 202 with the lens mount 102. Additionally, the main body 100 includes a connection terminal unit 101 for electrically connecting with the lens device 200, and is connected to the connection terminal portion 201 of the lens device 200. The system control unit 120 includes a transmission unit and a reception unit, and can communicate with the lens control unit 203 via the connection terminal units 101 and 201.

The accessory shoes 111 (main body side) and 301 are interface units that connect the flash unit 300 serving as an external device to the main body 100. The flash unit 300 and the main body 100 are electrically connected via the accessory the shoes 111 and 301. A flash light emission control unit 302 that controls the entire flash unit 300 controls amounts of light emission and a timing for light emission to a light emitting unit such as a xenon tube (not illustrated) based on information from the photometry unit 142.

The lens apparatus 200 is an interchangeable lens type lens unit, and includes a lens 210 and a diaphragm 211. The lens 210 is configured by a plurality of lens groups, having a zoom lens, a focus lens, an image shake correcting lens that corrects image shake caused by camera shake, and the like. The lights from the object pass through the lens 210, the diaphragm 211, the lens mounts 202 and 102, and the shutter 144 to form an image on the imaging element 121. Additionally, the photometry unit 142 and the distance measuring unit 143 detect object lights that have passed through the lens 210, the diaphragm 211, and the lens mounts 202 and 102.

The lens control unit 203 controls the entire lens apparatus 200. The lens control unit 203 includes a memory that stores, for example, constants, variables, programs for operation. Additionally, the lens control unit 203 includes a nonvolatile memory that stores identification information such as a number unique to the lens apparatus 200, management information, function information such as a maximum aperture value and a minimum aperture value, a focal length, and present and past setting values. The lens control unit 203 controls the focus adjustment of the lens 210 in accordance with the information of the in-focus state of the image that has been measured by the distance measurement unit 143 or the image calculation unit 129. The AF operation is performed by changing the image forming position of the object light incident on the imaging element 121. Additionally, the lens control unit 203 controls the aperture 211 and the zooming of the lens 210.

The lens driving unit 204 drives the lens 210 and the diaphragm 211 in accordance with the control signal from the lens control unit 203. The lens driving unit 204 includes a focus adjustment mechanism unit, a zooming mechanism unit, an image shake correction mechanism unit, and a diaphragm mechanism unit. The lens driving unit 204 drives the focus lens based on the focus adjustment control signal from the lens control unit 203 and drives the zoom lens based on a zooming control signal. Additionally, the lens driving unit 204 drives an image shake correction lens in accordance with the control signal for image shake correction from the lens control unit 203. Furthermore, the lens driving unit 204 drives the diaphragm 211 in accordance with the aperture control signal from the lens control unit 203.

A shake detection unit 205 has a gyro sensor and the like, and detects amounts of vibrations of the lens device 200. The shake detection unit 205 detects, for example, shaking in biaxial directions, the pitch direction and the yaw direction, from among the pitch direction, the yaw direction, and the roll direction shown in FIG. 3, and outputs a detection signal to the lens control unit 203. The lens control unit 203 controls the driving of the image shake correction lens in accordance with the detected shaking, and performs optical image shake correction. In image shake correction of images, a method using driving control of the image shake correction lens, a method for electronically correcting image shake by using image processing, and a method using movement control of the imaging element 121 are independently performed, or simultaneously used properly.

First Embodiment

A first embodiment will be described with reference to FIGS. 2 to 6. In the present embodiment, a description will be given of a process that acquires driving frequency information of the lens driving unit 204 and controls a function using the shake detection unit 151.

Figure 2:
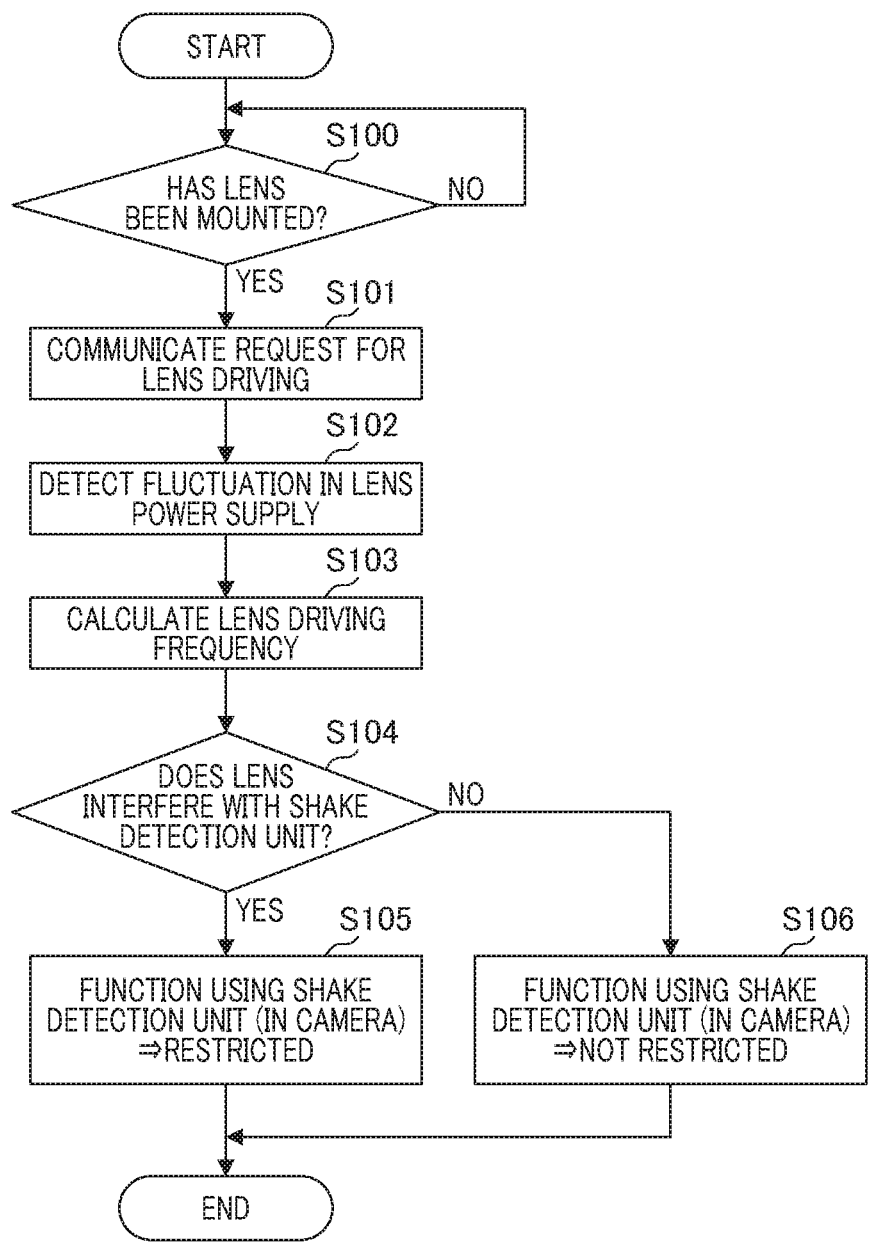
FIG. 2 is a flowchart illustrating a process in the first embodiment of the present invention.

FIG. 2 is a flowchart illustrating a process that changes the control of image shake correction of the main body 100 by using the lens device 200 that has been mounted. The process below starts from the time point that the main body 100 is activated by operating the operation part 132 in a state in which the lens device 200 is mounted on the main body 100 via the lens mounts 202 and 102.

In step S100, the system control unit 120 determines whether or not the lens device 200 has been mounted on the main body 100 via the lens mounts 202 and 102. If the mounting of the lens device 200 on the main body 100 is detected, the process proceeds to step S101, and if not, a determination process in step S100 is repeated.

In step S101, the system control unit 120 communicates a request for lens driving to the lens control unit 203. Examples of the request for lens driving include a request for driving AF (auto focus), a request for driving an aperture, a request for driving a camera shake correction mechanism unit, and the like. In step S102, the power supply fluctuation detection unit 133 detects the fluctuation in the lens device power supply while driving of the lens device 200 in accordance with the instruction from the system control unit 120. The power supply fluctuation information is held in the memory.

In step S103, the frequency calculation unit 134 calculates the driving frequency of the lens driving unit 204 based on the power supply fluctuation information acquired in step S102, in accordance with the an instruction from the system control unit 120. For example, the power supply fluctuation information includes information about a power supply fluctuation waveform or a current fluctuation waveform. The frequency calculation unit 134 acquires a frequency spectrum by fast Fourier transformation (FFT).

In step S104, the system control unit 120 determines whether or not the driving frequency of the shake detection unit 151 of the main body 100 and the driving frequency of the lens driving unit 204 interfere with each other based on the driving frequency of the lens driving unit 204 acquired in step S103. If it is determined that interference occurs, the process proceeds to step S105, and if it is determined that interference does not occur, the process proceeds to step S105. If the driving frequency of the lens driving unit 204 cannot be calculated, the process proceeds to step S106.

In step S105, the system control unit 120 performs a process that inhibits or restricts a function using the shake detection unit 151, for example, the image shake correction function and the panning shot function. In step S106, the system control unit 120 performs a process that does not inhibit or restrict the function using the shake detection unit 151, for example, the image shake correction function and the panning shot function. If a lens device in which interference occurs is replaced with a lens device in which interference does not occur during the activation of the body unit 100, a process that cancels inhibiting and restricting the function is performed. If the frequency calculation unit 134 has not been able to calculate the driving frequency of the external device, the system control unit 120 does not perform the process of inhibiting or restricting the function.

Next, a description will be given of a process related to the image shake correction function, which serves as a function using the shake detection unit 151. As shown in FIG. 3, vibrations such as camera shake detected by the shake detection unit 151 of the main body 100 have vibration components in three axial directions, the pitch direction, the yaw direction, and the roll direction. The shake correction function of the main body 100 is realized by the optical correction performed by the lens control unit 203 and the electronic correction on the shot image that has been read out from the imaging element 121. In accordance with the vibration component in each direction. For example, the optical correction performed by the lens control unit 203 is image shake correction on the vibration components in the pitch direction and the yaw direction, and the electronic correction performed by the system control unit 120 is image shake correction on the vibration components in the roll direction. Note that in some cases, the lens device 200 does not have a mechanism unit that performs optical correction. In this case, the system control unit 120 performs electronic image shake correction on the vibration components not only in the roll direction, but also in the pitch direction and the yaw direction.

Figure 4A:
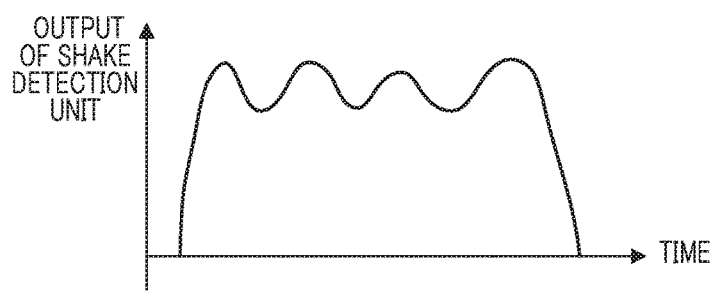
FIGS. 4A and 4B are diagrams illustrating a relation between amounts of detected vibrations and image shake correction amounts according to the first embodiment.

FIG. 4 illustrates the relation between the output of the shake detection unit 151 of the main body 100 and the shake correction amount to be processed for realizing the image shake correction function. The data for the amounts of vibrations detected by the shake detection unit 151 are transmitted to the system control unit 120 to serve as an analog signal or digital data. FIG. 4A illustrates a temporal change in the amounts of vibrations detected by the shake detection unit 151. The horizontal axis represents the time axis and the vertical axis represents the output of the shake detection unit 151. The amounts of vibrations detected by the shake detection unit 205 of the lens device 200 are also similar to those in in FIG. 4A.

Figure 4B:
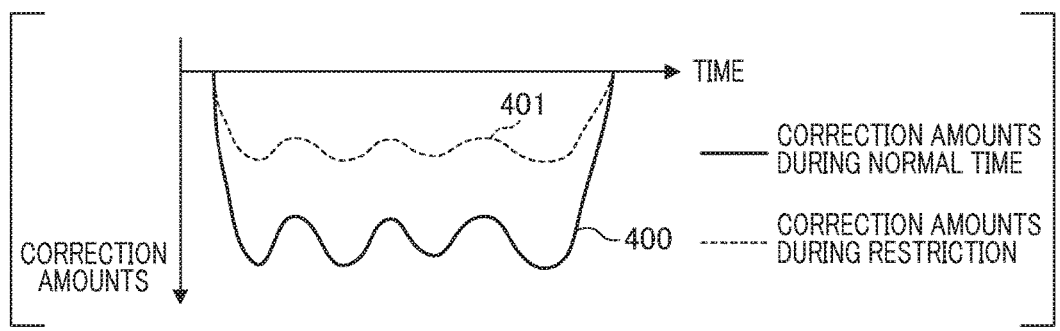

The system control unit 120 and the lens control unit 203 calculate image shake correction amounts based on the data of the detected amounts of vibrations. FIG. 4B illustrates a change in the image shake correction amounts, in which the horizontal axis represents the time axis and the vertical axis represents the image shake correction amounts. For example, in the method of calculating the image shake correction amounts by carrying out calculation that simply cancels the amounts of vibrations, the image shake correction amounts change as illustrated in the graph shown by a solid line 400 in FIG. 4B. In this case, the image shake correction amounts obtained by inverting the amounts of vibrations in FIG. 4A are calculated, and the control of image shake correction is performed.

Next, a description will be given of how to process the image shake correction function in accordance with the driving frequency of the lens driving unit 204 of the lens device 200 that has been mounted. If the process proceeds from steps S104 to S106 in FIG. 2, specifically, if it is determined that the driving frequency of the lens driving unit 204 does not interfere with the driving frequency of the shake detection unit 151, image shake correction is permitted in all directions shown in FIG. 3. No restriction is imposed on the three axis directions of the pitch direction, the yaw direction, and the roll direction.

In contrast, if the process proceeds from step S104 to step S105 in FIG. 2, specifically, if it is determined that the driving frequency of the lens drive unit 204 interferes with the driving frequency of the shake detection unit 151, image shake correction is restricted. The system control unit 120 inhibits image shake correction or suppresses the image shake correction amounts. For example, as shown by the graph with a dotted line 401 in FIG. 4B, a process that reduces the image shake correction amounts by half is performed, and a restriction is imposed on the image shake correction function using the shake detection unit 151. However, the correction in the pitch direction and the yaw direction is permitted only if the lens control unit 203 performs optical image shake correction on each vibration component in the pitch direction and the yaw direction.

The above processes are summarized in the table shown in FIG. 5. FIG. 5 is a table that illustrates the relation between the driving frequency of the lens device 200 mounted on the main body 100 and the image shake correction process. The correcting directions are three axis directions of the pitch direction, the yaw direction, and the roll direction. An image shake correction compatible lens is a lens device that is compatible with the execution of the image shake correction function. For example, in a lens device in which interference of the driving frequency does not occur, the image shake correction for all the vibration components in the three axis directions is permitted in the image shake correction compatible lens. In this case, the lens control unit 203 performs control of the optical image shake correction. Additionally, in the image shake correction incompatible lens, the image shake correction for all the vibration components in the three axis directions is permitted. In this case, the system control unit 120 performs control of the electronic image shake correction.

In contrast, in the lens device in which the interference of the driving frequency occurs, image shake correction for the vibration components in the pitch direction and the yaw direction from among the three axis directions is permitted in the image shake correction compatible lens. The lens control unit 203 performs optical image shake correction for the vibration components in the pitch direction and the yaw direction. The image shake correction for the vibration component in the roll direction is inhibited or restricted. The inhibition of the image shake correction includes a temporary stop. In restricting the image shake correction, a control range of the electronic image shake correction performed by the system control unit 120 is limited. Additionally, in the image shake correction incompatible lens, the image shake correction for the vibration components in all three axial directions is inhibited or restricted. In this case, the system control unit 120 appropriately determines whether the image shake correction is to be inhibited, stopped, or restricted based on the shooting state, the vibration state, and the like. In partially restricting the image shake correction, the system control unit 120 performs electronic image shake correction within a limited control range.

Additionally, by applying the above-described image shake correcting function, shooting in which the background image flows can be performed while image shake of the object image is suppressed during a panning shot. Based on the panning angular velocity of the main body 100 detected by the shake detection unit 151 and the information about the captured image, the system control unit 120 controls the shutter speed in accordance with the degree of background flow based on the amounts of the movement of the object. Realizing such a function that supports panning shots can lead to performing appropriate camera setting for a panning shot even for a user who does not have sufficient skills. A specific example will be described with reference to FIG. 6.

FIG. 6 is a table that illustrates how to process the panning shot function in accordance with the driving frequency of the lens driving unit 204 of the lens device 200 mounted on the main body 100. For example, the user can set the degree of the background flow in three levels, "high", "medium" (standard), and "low" according to the preference of the user. The user can set the degree of panning of the background by displaying a setting screen on the display unit 110.

If the process proceeds from step S104 to step S106 in FIG. 2, specifically, in the case that the lens device determined not to cause the interference of the driving frequency, the setting of the degree of the background flow in the panning shot function can be compatible with a plurality of levels (three levels in FIG. 6). In contrast, if the process proceeds from step S104 to step S105 in FIG. 2, it is determined that the interference of the driving frequency occurs, so that the setting of the degree of the background flow in the panning shot function is restricted. For example, "high" and "low" from among the three stages are not supported, and only "medium", which is the standard setting, can be supported. The success probability of the panning shot can be increased by imposing restrictions on the setting of the degree of the background flow.

In the present embodiment, the frequency calculation unit 134 calculates the driving frequency of the lens driving unit 204, and the system control unit 120 determines the interference with the driving frequency of the shake detection unit 151 of the main body 100. The system control unit 120 does not need to acquire the driving frequency of the lens driving unit 204 from the lens control unit 203. If the driving frequency of the lens drive unit 204 interferes with the driving frequency of the shake detection unit 151, the function using the shake detection unit 151 is inhibited or restricted, so that the influence of noise due to vibrations received from the lens device 200 can be avoided or suppressed.

Second Embodiment

A second embodiment will be described with reference to FIGS. 7 and 8. In the present embodiment, the same reference numerals are provided to the components that are the same in configurations as those in the first embodiment, the detailed description of those components will be omitted, and mainly the differences will be explained. The way of omitting such descriptions is the same in the embodiments to be described below.

Figure 7:
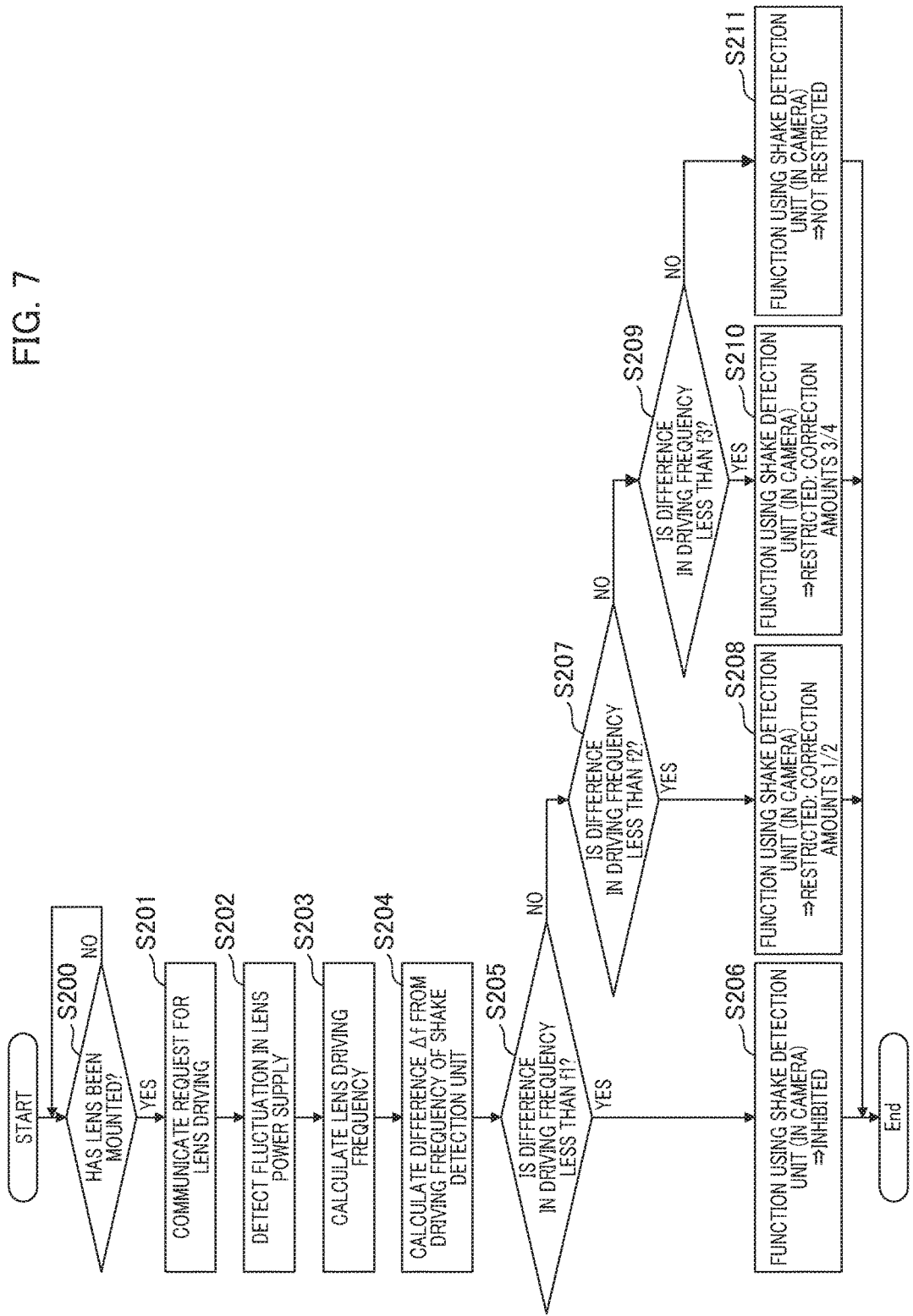
FIG. 7 is a flowchart illustrating a process in the second embodiment of the present invention.

FIG. 7 is a flowchart that illustrates a process that changes image shake correction control of the imaging apparatus in accordance with the difference between the driving frequency of the lens driving unit 204 and the driving frequency of the shake detection unit 151.

FIG. 8 illustrates the relation between the amounts of vibrations detected by the shake detection unit 151 or 205 and amounts of shake correction to be processed for realizing the image shake correction function. FIG. 8A illustrates the amounts of vibrations when the amounts of vibrations detected by the shake detection unit 151 or 205 are transmitted to the system control unit 120 to serve as an analog signal or digital data. The horizontal axis represents the time axis and the vertical axis represents the output of the shake detection unit. FIG. 8B illustrates a temporal change of the image shake correction amounts. Graph curves 800, 801, and 802 indicate the image shake correction amounts calculated by the system control unit 120 and the lens control unit 203. For example, in calculating the image shake correction amounts by using a calculation that simply cancels the detected vibration amounts, the image shake correction function is controlled by using the image shake correction amount acquired by inverting the amounts of vibrations in FIG. 8A, as shown by the graph curve 800 with a solid line in FIG. 8B.

Next, with reference to FIG. 7, a description will be given of a process that changes control of the image shake correction in accordance with the difference between the driving frequency of the lens driving unit 204 and the driving frequency of the shake detection unit 151. The process below starts from a time point when the main body 100 is activated by the operation of the operation part 132, with the lens unit 200 being mounted on the main body 100 via the lens mounts 202 and 102. Since the processes of steps S200 to S203 are similar to those in steps S100 to S103 in FIG. 2, their descriptions will be omitted.

In step S204, the frequency calculation unit 134 calculates the difference (hereinafter, referred to as "$\Delta f$") between the driving frequency of the lens driving unit 204 that has been acquired in step S203 and the driving frequency of the shake detection unit 151. In step S205, the system control unit 120 determines whether or not the difference $\Delta f$ in the driving frequency calculated in step S204 is less than the first threshold value (referred to as "f1"). If the difference $\Delta f$ is determined to be less than f1, it is determined that the lens device has a large degree of interference, and the process proceeds to step S206. If the difference $\Delta f$ is determined to be equal to or larger than f1, the process proceeds to step S207.

In step S206, the system control unit 120 performs a process that inhibits the function using the shake detection unit 151 (hereinafter, the image shake correction function is taken as an example). In step S207, the system control unit 120 determines whether or not the difference $\Delta f$ in the driving frequency calculated in step S204 is less than a second threshold value (referred to as "f2". f2>f1). If the difference $\Delta f$ is determined to be less than f2, it is determined that the lens device has a medium degree of interference, and the process proceeds to step S208. If the difference Δf is determined to be equal to or larger than f2, the process proceeds to step S209.

In step S208, the system control unit 120 restricts the image shake correction amounts in the image shake correction function using the shake detection unit 151. As shown by the graph curve 801 with a dotted line in FIG. 8B, a process that restricts the image shake correction amounts to ½, compared to a case in which the image shake correction amounts are not restricted, is performed.

In step S209, the system control unit 120 determines whether or not the difference Δf in the driving frequency calculated in step S204 is less than a third threshold value (referred to as "f3". f3>f2). If the difference Δf is determined to be less than f3, it is determined that the lens device has a small degree of interference, and the process proceeds to step S210. If the difference Δf is equal to or larger than f3, it is determined that the lens device does not cause interference, and the process proceeds to step S211.

In step S210, the system control unit 120 restricts the image shake correction amounts in the image shake correction function using the shake detection unit 151. As shown by the graph curve 802 of a two-dot chain line in FIG. 8B, a process that restricts the image shake correction amounts to ¾, compared to a case in which the image shake correction amounts are not restricted, is performed.

After the processes of steps S206, S208, S210, and S211, the series of processes ends. Note that the coefficients ½ and ¾ for restricting the image shake correction amounts in steps S208 and S210 are examples, and the calculation formula for obtaining the image shake correction amounts is not restricted. The present embodiment has described the control of the image shake correction amounts in stages. However, the image shake correction amounts may be restricted by directly calculating a correction coefficient corresponding to the difference Δf in the driving frequency and multiplying the image shake correction amounts by the coefficient.

In step S211, the system control unit 120 executes a process without imposing a restriction on the image shake correction function using the shake detection unit 151.

In the present embodiment, the correction direction in the image shake correction function is the same as that described in the first embodiment with reference to FIG. 3. The relation between the type of the lens device 200 and the image shake correction processing is the same as that described in the first embodiment with reference to FIG. 5.

In the present embodiment, the system control unit 120 changes the control of the image shake correction of the imaging apparatus in accordance with the difference between the driving frequency of the lens drive unit 204 and the driving frequency of the shake detection unit 151. According to the present embodiment, in addition to the effect of the first embodiment, it is possible to achieve an effect in which appropriate control is performed in accordance with the extent in which the driving frequency of the lens driving unit 204 interferes with the driving frequency of the shake detection unit 151.

Third Embodiment

Figure 9:
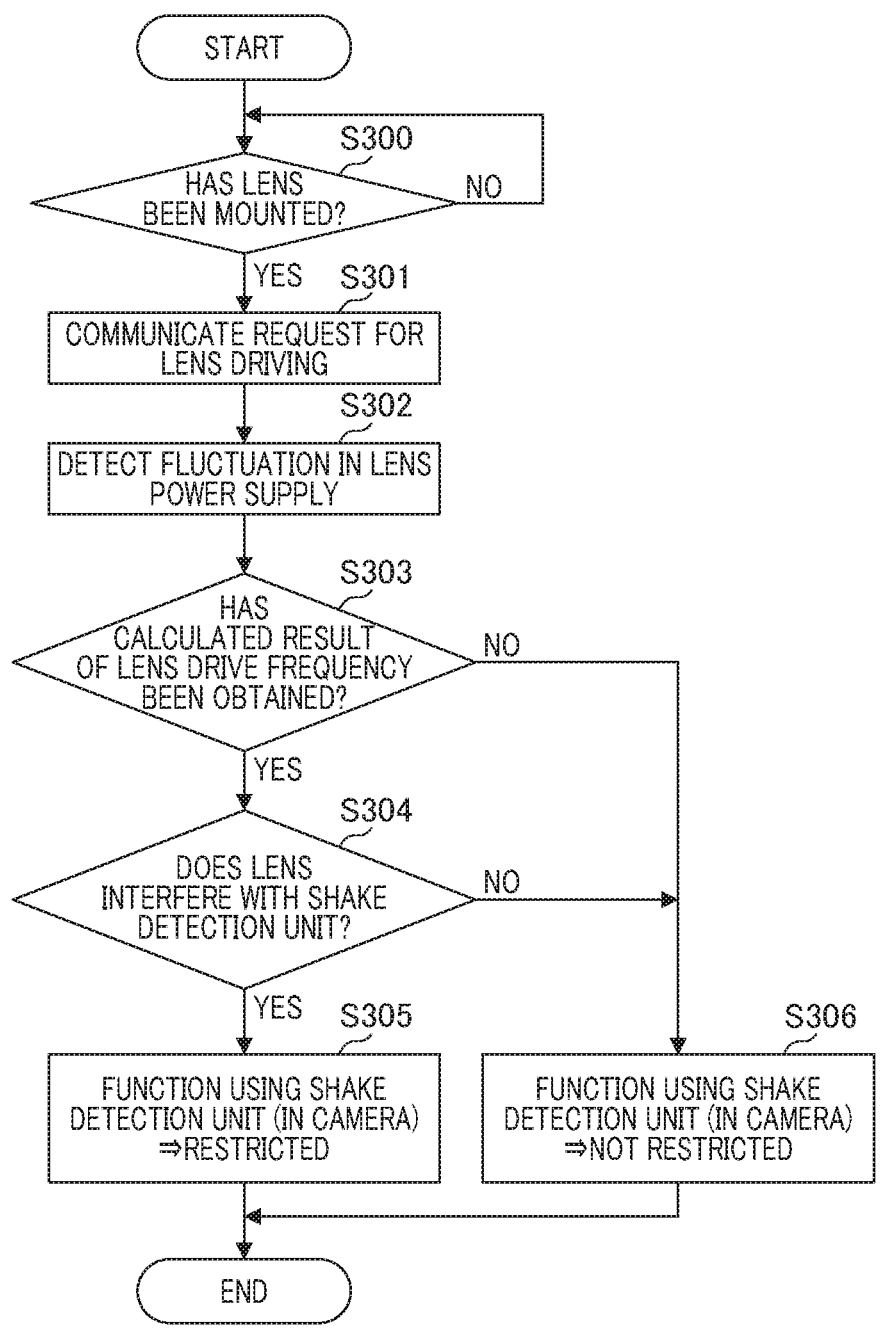
FIG. 9 is a flowchart illustrating a process in the third embodiment of the present invention.

A third embodiment will be described with reference to FIGS. 9 and 10. FIG. 9 is a flowchart that illustrates a process that changes the control of the image shake correction by using the lens device 200 mounted on the main body 100. The process below starts from a time point when the main body 100 is activated by the operation of the operation part 132, with the lens device 200 being mounted on the main body 100 via the lens mounts 202 and 102. Since the processes in steps S300 to S302 are similar to those in steps S100 to S102 in FIG. 2, their descriptions will be omitted.

In step S303, the frequency calculation unit 134 calculates a driving frequency of the lens device 200 based on the power supply fluctuation information acquired in step S302 based on the instruction from the system control unit 120. If the maximum value in the frequency spectrum has been obtained from the calculated result (in the case of FIG. 10B), the process proceeds to step S304. If the maximum value in the frequency spectrum has not been obtained from the calculated result (in the case of FIG. 10D), the process proceeds to step S306. A detailed description will be given with reference to FIG. 10. The frequency spectrum can be obtained by performing fast Fourier transform (FFT) on the power supply fluctuation waveform or the current fluctuation waveform.

In step S304, the system control unit 120 determines whether or not the driving frequency of the shake detection unit 151 of the main body 100 and the driving frequency of the lens driving unit 204 interfere with each other based on the driving frequency of the lens driving unit 204 acquired in step S303. If it is determined that the lens device causes interference, the process proceeds to step S305. If it is determined that the lens device does not cause interference, the process proceeds to step S306.

In step S305, the system control unit 120 imposes a restriction on the function using the shake detection unit 151, for example, the image shake correction function and the panning shot function. The restriction is the same as that described in FIGS. 3 to 6 in the first embodiment. Additionally, in step S306, the system control unit 120 does not impose a restriction on the function using the shake detection unit 151, for example, the image shake correction function and the panning shot function.

Next, with reference to FIG. 10, the determination process in step S303 in FIG. 9 will be described. FIG. 10 illustrates a current fluctuation waveform of the power supply of the lens device and a driving frequency spectrum of the lens driving unit 204 obtained from the current fluctuation waveform.

Figure 10A:
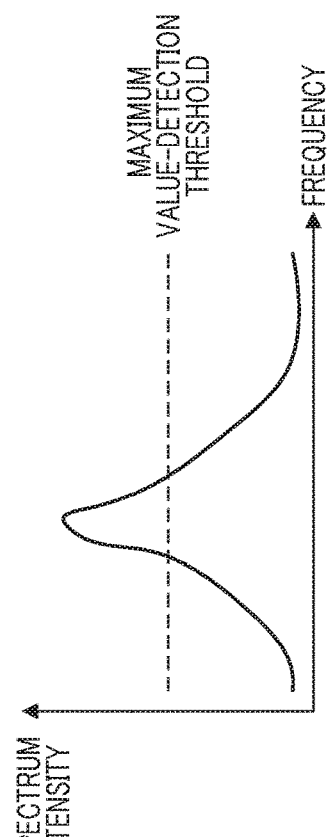
FIGS. 10A to 10D are diagrams illustrating a current fluctuation waveform during lens driving and a frequency spectrum in the third embodiment.
Figure 10B:
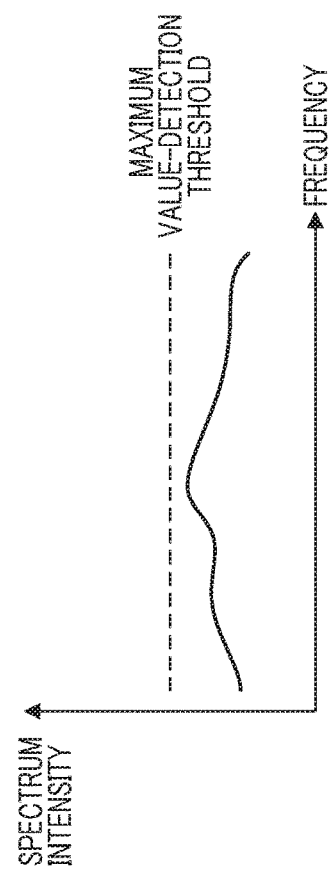

FIG. 10A illustrates a current fluctuation waveform during operation of the lens driving unit 204 with a specific driving frequency. The horizontal axis represents the time axis and the vertical axis represents a current value during lens driving. FIG. 10B illustrates a frequency spectrum obtained by Fourier transform performed by the frequency calculation unit 134 on the current fluctuation waveform in FIG. 10A. The horizontal axis represents the frequency axis and the vertical axis represents the spectrum intensity. FIG. 10B illustrates a state in which the spectrum intensity reaches the maximum.

Figure 10C:
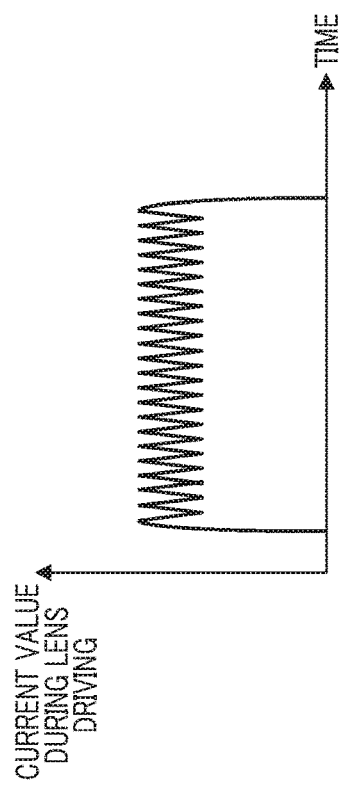
Figure 10D:
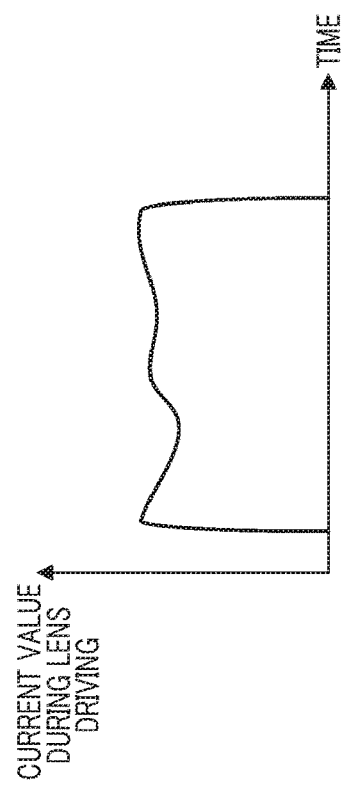

FIG. 10C illustrates a current fluctuation waveform during non-operation of the lens driving unit 204 at a specific driving frequency. The settings of the horizontal axis and the vertical axis is the same as that in FIG. 10A. FIG. 10D illustrates a frequency spectrum obtained by the Fourier transform performed by the frequency calculation unit 134 on the current fluctuation waveform in FIG. 10C. The setting of the horizontal axis and the vertical axis is the same as that in FIG. 10B. FIG. 10D illustrates a state in which the spectrum intensity does not reach the maximum.

A level shown by a dotted line in FIGS. 10B and D indicates a maximum value-detection threshold value in spectrum intensity. As shown in FIG. 10B, if the spectrum intensity exceeds the maximum value-detection threshold value, the system control unit 120 determines that a frequency band that exceeds the maximum value-detection threshold value is a driving frequency range of the lens driving unit 204. In contrast, as shown in FIG. 10D, if the spectrum intensity does not exceed the maximum value-detection threshold value, the system control unit 120 determines that the lens driving unit 204 is not operating at a specific driving frequency.

In the present embodiment, if the maximum value of the frequency spectrum cannot be obtained from the fluctuation waveform of the power supply of the lens device by the frequency calculation unit 134, it is possible to determine that the lens driving unit 204 is not operating at the specific frequency. According to the present embodiment, in addition to the effect of the first embodiment, it is possible to determine whether or not the driving frequency of the lens driving unit 204 and the driving frequency of the shake detection unit 151 interfere with each other based on the frequency spectrum from the power supply fluctuation waveform.

According to the present embodiment, it is possible to take countermeasures for avoiding interference that occurs if the driving frequency of the drive unit having an inherent driving frequency, which cannot be controlled from the main body, and the driving frequency of the angular velocity sensor are close, in a state in which an external device such as an interchangeable lens and the like is mounted on the main body of the imaging apparatus. Accordingly, it is possible to provide an imaging system that can avoid the influence of interference due to vibrations and noises generated from the drive unit of the external device and execute the function using the shake detection unit in the main body without causing difficulties. As described above, although the preferred embodiments of the present invention have been described, the present invention is not limited to these embodiments, and various modifications and changes are possible within the scope of the gist thereof.

Other Embodiments

There are variations and modifications of the embodiments below. In the above embodiments, although the lens device has been described as an example of the external device, any type of accessory devices having a driving unit can be applied. Additionally, in the above described embodiment, although the frequency calculation unit 134 calculates the driving frequency of the lens driving unit 204, any processing unit that performs calculation processing can be applied. The calculation for calculating the difference between the driving frequency of the lens driving unit 204 and the driving frequency of the shake detection unit 151 by using the frequency calculation unit 134 and the FFT calculation of the power supply fluctuation waveform are examples. Accordingly, any calculating processing can be used. The driving frequency of the lens driving unit 204 may be continuous driving frequencies or discrete driving frequencies. In the above embodiment, although the image shake correction function and the panning shot function have been described as an example of the function using the shake detection unit 151, this can be applied to any function. Additionally, with regard to the image shake correction amount in FIGS. 4B and 8B, although the example of the calculation of inverting the output of the shake detection unit 151 has been described, any correction calculation method may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-124595, filed Jun. 26, 2017 which is hereby incorporated by reference wherein in its entirety.

What is claimed is:

1. An imaging apparatus that can mount an external device on a main body comprising:
   at least one processor and at least one memory functioning as:
      a first detection unit configured to detect a shake of the main body;
      a power supply unit configured to supply a power supply from the main body to the external device mounted on the main body;
      a second detection unit configured to detect a fluctuation in the power supply;
      a calculation unit configured to calculate a driving frequency of the external device based on the fluctuation in the power supply detected by the second detection unit; and
      a control unit configured to perform control that avoids or suppresses an influence on a function that has used the first detection unit caused by the driving frequency of the external device, which has been calculated by the calculation unit, interfering with a driving frequency of a detector used for detecting the shake of the main body by the first detection unit.

2. The imaging apparatus according to claim 1, wherein, if the driving frequency of the external device interferes with the driving frequency of the detector used for detecting the shake of the main body by the first detection unit, the control unit inhibits or restricts the function using the first detection unit.

3. The imaging apparatus according to claim 2, wherein the calculation unit calculates a difference between the driving frequency of the external device and the driving frequency of the detector used for detecting the shake of the main body by the first detection unit, and
   wherein, if the difference is less than a threshold value, the control unit inhibits or restricts the function using the first detection unit.

4. The imaging apparatus according to claim 3, wherein the control unit calculates an image shake correction amount corresponding to the difference and controls an image shake correction unit.

5. The imaging apparatus according to claim 4, wherein the control unit restricts the image shake correction function by multiplying the image shake correction amount by a coefficient corresponding to the difference.

6. The imaging apparatus according to claim 4, wherein the control unit inhibits the function using the first detection unit if the difference is less than a first threshold value, and the control unit restricts the function using the first detection unit if the difference is larger than the first threshold value and less than a second threshold value.

7. The imaging apparatus according to claim 1, wherein the control unit controls an image shake correction function using the first detection unit.

8. The imaging apparatus according to claim 1, wherein the calculation unit calculates a frequency spectrum during driving of the external device, and wherein, if the maximum value of the frequency spectrum is detected and the driving frequency of the external device interferes with the driving frequency of the detector used for detecting the shake of the main body by the first detection unit, the control unit inhibits or restricts the function using the first detection unit.

9. The imaging apparatus according to claim 1, wherein the external device comprises a lens, and
wherein the function using the first detection unit is a function that supports panning shot.

10. The imaging apparatus according to claim 9, further comprising:
a setting unit configured to set a degree of background flow in panning shot,
wherein, if the driving frequency of the external device interferes with the driving frequency of the detector used for detecting the shake of the main body by the first detection unit, the control unit restricts the setting of the degree of the background flow.

11. The imaging apparatus according to claim 1, wherein, if the driving frequency of the external device cannot be calculated by the calculation unit, the control unit does not inhibit or restrict the function using the first detection unit.

12. A control method executed by an imaging apparatus that can mount an external device on a main body comprising, the method comprising:
detecting a shake of the main body by a first detection unit;
supplying a power supply from the main body to the external device;
detecting a fluctuation in the power supply by a second detection unit;
calculating a driving frequency of the external device by a calculation unit based on the fluctuation in the power supply detected by the second detection unit; and
performing control that avoids or suppresses an influence on a function that used the first detection unit caused by the driving frequency of the external device, which has been calculated by the calculation unit, interfering with a driving frequency of a detector used for detecting the shake of the main body by the first detection unit by a control unit.

* * * * *